(12) United States Patent
Sun et al.

(10) Patent No.: US 10,298,997 B2
(45) Date of Patent: May 21, 2019

(54) METHODS FOR UPLOADING FILE TO TELEVISION SET AND PLAYING FILE, TELEVISION SET AND USER EQUIPMENT

(71) Applicants: HISENSE MOBILE COMMUNICATIONS TECHNOLOGY CO., LTD., Qingdao (CN); HISENSE USA CORP., Suwanee, GA (US)

(72) Inventors: Yongrui Sun, Qingdao (CN); Yanfang Chen, Qingdao (CN)

(73) Assignees: HISENSE MOBILE COMMUNICATIONS TECHNOLOGY CO., LTD., Qingdao (CN); HISENSE USA CORP., Suwanee, GA (US)

( * ) Notice: Subject to any disclaimer, the term of this patent is extended or adjusted under 35 U.S.C. 154(b) by 186 days.

(21) Appl. No.: 14/297,339

(22) Filed: Jun. 5, 2014

(65) Prior Publication Data

US 2015/0271241 A1    Sep. 24, 2015

(30) Foreign Application Priority Data

Mar. 24, 2014 (CN) .......................... 2014 1 0110912

(51) Int. Cl.
*G06F 15/16* (2006.01)
*H04N 21/436* (2011.01)
(Continued)

(52) U.S. Cl.
CPC ... *H04N 21/43615* (2013.01); *H04N 21/4122* (2013.01); *H04L 67/02* (2013.01); *H04L 67/2823* (2013.01); *H04N 21/2743* (2013.01)

(58) Field of Classification Search
CPC ............. H04L 67/1097; H04L 12/2803; H04L 12/2801; H04L 12/2805; H04L 67/2823; H04N 21/2665; H04N 21/47202
(Continued)

(56) References Cited

U.S. PATENT DOCUMENTS 6,489,980 B1 * 12/2002 Scott .................... G06F 17/3089
707/E17.116
7,631,336 B2 * 12/2009 Diaz Perez ............ G06Q 30/02
725/109
(Continued)

FOREIGN PATENT DOCUMENTS

CN          1801804 A      7/2006
CN          102497591 A    6/2012
(Continued)

OTHER PUBLICATIONS

EP 14189473.3-1954, European Search Report dated Feb. 9, 2015, 7 pages.
(Continued)

*Primary Examiner* — Kristie D Shingles
(74) *Attorney, Agent, or Firm* — Knobbe, Martens, Olson & Bear LLP (57) ABSTRACT

Methods for uploading a file to a television set and playing a file, television set and user equipment are disclosed. The method for uploading a file to a television set includes: sending by a browser in a User Equipment, UE, a request to the television set to obtain a file upload page, wherein the request carries a Uniform Resource Locator, URL, address of the file upload page; and receiving by the browser in the UE the file upload page with which the television set responds, and uploading at least one file through the file upload page to the television set.

18 Claims, 5 Drawing Sheets

(51) Int. Cl.
*H04N 21/41* (2011.01)
*H04N 21/2743* (2011.01)
*H04L 29/08* (2006.01)

(58) Field of Classification Search
USPC .................................................. 709/217, 206
See application file for complete search history.

(56) References Cited

U.S. PATENT DOCUMENTS

| | | | | |
|---|---|---|---|---|
| 7,774,819 | B2* | 8/2010 | Perez | G06Q 30/02 |
| | | | | 725/109 |
| 8,010,157 | B1* | 8/2011 | Fujisaki | H04M 1/575 |
| | | | | 455/12.1 |
| 9,027,064 | B1* | 5/2015 | Opare-Abetia | H04N 21/238 |
| | | | | 725/115 |
| 9,143,341 | B2* | 9/2015 | Harrang | H04L 12/00 |
| 9,232,174 | B1* | 1/2016 | Kotab | H04N 21/4126 |
| 2002/0070961 | A1* | 6/2002 | Xu | G06F 3/04892 |
| | | | | 715/738 |
| 2007/0294726 | A1 | 12/2007 | Drazin | |
| 2009/0070832 | A1* | 3/2009 | Urban | H04N 7/173 |
| | | | | 725/86 |
| 2009/0112719 | A1* | 4/2009 | Bhave | G06Q 10/107 |
| | | | | 705/14.46 |
| 2010/0081475 | A1 | 4/2010 | Chiang et al. | |
| 2010/0095240 | A1 | 4/2010 | Shiplacoff et al. | |
| 2010/0153999 | A1* | 6/2010 | Yates | H04N 5/44543 |
| | | | | 725/39 |
| 2010/0281506 | A1* | 11/2010 | Schmidt | H04N 5/76 |
| | | | | 725/46 |
| 2011/0312379 | A1* | 12/2011 | Wallace, Jr. | H04M 1/72525 |
| | | | | 455/557 |
| 2012/0178426 | A1* | 7/2012 | Filipov | H04L 12/281 |
| | | | | 455/414.1 |
| 2012/0254927 | A1* | 10/2012 | Kim | H04N 21/41407 |
| | | | | 725/109 |
| 2012/0296718 | A1* | 11/2012 | Kennedy | G06Q 30/06 |
| | | | | 705/14.16 |
| 2013/0047178 | A1 | 2/2013 | Moon et al. | |
| 2014/0157336 | A1* | 6/2014 | Deegan | H04L 65/605 |
| | | | | 725/91 |
| 2015/0046557 | A1* | 2/2015 | Rosenberg | H04L 12/2803 |
| | | | | 709/213 |

FOREIGN PATENT DOCUMENTS

| | | |
|---|---|---|
| CN | 103024504 A | 4/2013 |
| CN | 103581759 A | 2/2014 |

OTHER PUBLICATIONS

Yan, "Realization of XML-based and Non-module File Upload", Computer Engineering, vol. 29, No. 4, Mar. 2003. pp. 196-197.

* cited by examiner

METHODS FOR UPLOADING FILE TO TELEVISION SET AND PLAYING FILE, TELEVISION SET AND USER EQUIPMENT

CROSS-REFERENCES TO RELATED APPLICATIONS

This application claims priority to Chinese patent application No. 201410110912.4 filed on Mar. 24, 2014 and titled "METHODS FOR UPLOADING FILE TO TELEVISION SET AND PLAYING FILE, TELEVISION SET AND USER EQUIPMENT", which is incorporated herein by reference in its entirety.

Field

The present disclosure relates to methods for uploading a file to a television set and playing a file, television set and user equipment.

Background

Along with the evolving idea of television-centric home multimedia, more and more users prefer to play on their television sets audio and video resources available on handsets, PDAs, computers and other User Equipments (UEs) for a better sense experience. How to play on the television sets the audio and video resources available on the handsets, the PDAs, the computers and the other user equipments has come therewith to a focus.

SUMMARY

An embodiment of the disclosure provides a method for uploading a file to a television set, the method including:
sending, by a browser in a User Equipment, UE, a request to the television set to obtain a file upload page, wherein the request carries a Uniform Resource Locator, URL, address of the file upload page; and
receiving, by the browser in the UE, the file upload page with which the television set responds, and uploading at least one file through the file upload page to the television set.

An embodiment of the disclosure further provides a method for playing a file on a television set, the method including:
receiving a request, sent by a User Equipment, UE, to obtain a file upload page, and responding to a browser in the UE with the file upload page in response to the request, wherein the request carries a Uniform Resource Locator, URL, address of the file upload page;
receiving at least one file uploaded by the UE through the file upload page; and
decoding and playing the received at least one file.

An embodiment of the disclosure further provides a User Equipment, UE, including:
a memory; and one or more processors, wherein the memory has one or more computer readable program codes stored therein, and the one or more processors are configured to execute the one or more computer readable program codes to perform:
sending, by a browser in a User Equipment, UE, a request to a television set to obtain a file upload page, wherein the request carries a Uniform Resource Locator, URL, address of the file upload page; and
receiving, by the browser in the UE, the file upload page with which the television set responds, and uploading at least one file through the file upload page to the television set.

An embodiment of the disclosure further provides a television set including:
a memory; and one or more processors, wherein the memory has one or more computer readable program codes stored therein, and the one or more processors are configured to execute the one or more computer readable program codes to perform:
receiving a request, sent by a User Equipment, UE, to obtain a file upload page, and responding to a browser in the UE with the file upload page in response to the request, wherein the request carries a Uniform Resource Locator, URL, address of the file upload page;
receiving at least one file uploaded by the UE through the file upload page; and
decoding and playing the received at least one file.

DETAILED DESCRIPTION OF THE PREFERRED EMBODIMENTS

Methods for uploading a file to a television set and playing a file according to the disclosure will be described below in further details with reference to the drawings and embodiments thereof.

Figure 1:
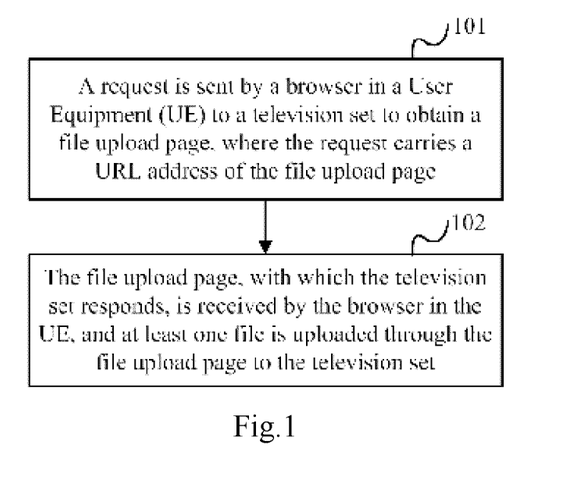
FIG. 1 is a flow chart of a method for uploading a file to a television set according to an embodiment of the disclosure.

An embodiment of the disclosure provides a method for uploading a file to a television set, the method being performed by one or more processors, and as illustrated in FIG. 1, the method includes:

In the block 101, a request is sent by a browser in a User Equipment (UE) to a television set to obtain a file upload page, wherein the request carries a Uniform Resource Locator (URL) address of the file upload page. Optionally the User Equipment (UE) and the television set are located in a same local area network.

Particularly the number of UEs sending the request to the television set to obtain the file upload page may be one or more, and the disclosure will not be limited in this respect.

In the block 102, the file upload page, with which the television set responds, is received by the browser in the UE, and at least one file is uploaded through the file upload page to the television set.

Particularly the file upload page includes at least an upload button, and upon reception of the page, the UE selects the corresponding file and clicks on the upload button to upload an audio and a video to the television set. Alternatively different upload buttons can be arranged for respective types of uploaded files, for example, an audio upload button, a video upload button, etc., can be arranged. Thus the file in the UE can be uploaded through a single file upload page to the television set with easy operation. Meanwhile, the size, the format, etc., of the uploaded file can be defined on the file upload page. Optionally the file upload page can be composed through HTML5.

Typically a handset, a PDA and other UEs are provided with their own browsers, and the television set is accessed through the browser in the UE and the URL address of the file upload page on the television set, thus no specific application is required to be installed on the UE side to support its function of accessing the television set to thereby alleviate a burden on the UE side. The television set responds to the browser in the UE with the file upload page, and at this time the file upload page will be displayed in the browser of the UE, and a user can upload the file to the television set through a relevant function of the file upload page for playing.

Further to the embodiment above, the request is sent by the browser in the User Equipment (UE) to the television set to obtain the file upload page particularly as follows:

The request is sent to the television set to obtain the file upload page by entering the URL address of the file upload page into the browser in the UE; or A two-dimension code address of the file upload page on the television set is obtained through scanning, the two-dimension code address is converted into a corresponding URL address, and the request is sent by the browser in the UE to the television set to obtain the file upload page.

Particularly the URL address or the two-dimension code of the file upload page is generated by the television set; and when the user chooses to enable a function, preset in the television set, for connection with the UE, the URL address or the two-dimension code of the file upload page is displayed on a setting page of the television set.

Particularly the file uploaded by the UE can be an audio file, a video file, a WORD document or another file, e.g., a Power Point (PPT) document, etc., and the size of the file is in a preset range.

In order to prevent the UE from uploading a too large file exceeding a load capacity of the television set, the size of a space occupied by the uploaded file can be defined, wherein the preset range of the size can be defined under a real situation, and the disclosure will not be limited in this respect.

The file uploaded in the embodiment of the disclosure can be a file which cannot be obtained from the Internet, e.g., an audio and a video of commemorative significance taken by the user himself or herself through the user equipment, or an audio and a video made by a police department for cracking a criminal case, so that these audios and videos can be presented by the television set to the user conveniently and rapidly.

Figure 2:
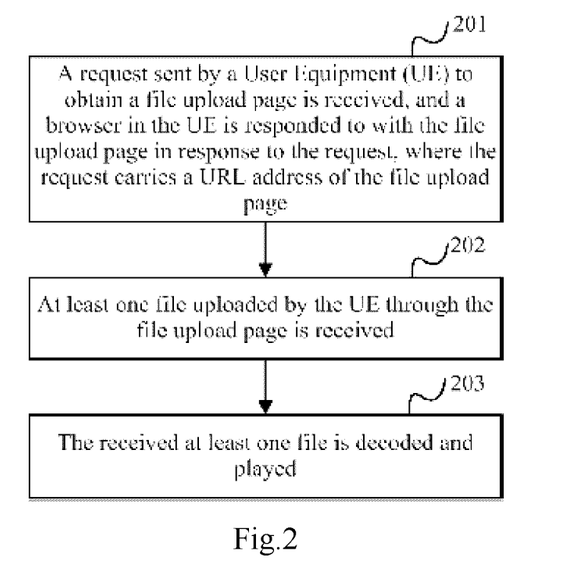
FIG. 2 is a flow chart of a method for playing a file on a television set according to an embodiment of the disclosure.

An embodiment of the disclosure further provides a method for playing a file by a television set, the method being performed by one or more processors, and as illustrated in FIG. 2, the method includes:

In the block 201, a request sent by a User Equipment (UE) to obtain a file upload page is received, and a browser in the UE is responded to with the file upload page in response to the request, wherein the request carries a URL address of the file upload page. Optionally the UE and the television set are located in a same local area network.

The television set can receive the request sent by one UE to obtain the file upload page or can receive concurrently the requests sent by multiple UEs to obtain the file upload page.

Particularly the URL address of the file upload page, sent by the UE is received, the corresponding file upload page is invoked according to the URL address, and the browser in the UE is responded to with the file upload page.

Particularly the URL address of the file upload page is generated by the television set, or a two-dimension code corresponding to the URL address is generated by the television set; and when the user chooses to enable a function, preset in the television set, for connection with the UE, the URL address or the two-dimension code of the file upload page is displayed on a setting page of the television set.

In the block 202, at least one file uploaded by the UE through the file upload page is received.

Particularly the at least one file uploaded by the UE through the file upload page can be an audio file, a video file, a WORD document or another file, e.g., a Power Point (PPT) document, etc., and in order to prevent the UE from uploading a too large file exceeding a load capacity of the television set, the size of a space occupied by the uploaded file can be defined, wherein the preset range of the size can be defined under a real situation, and the disclosure will not be limited in this respect.

In the block 203, the received at least one file is decoded and played.

Figure 3:
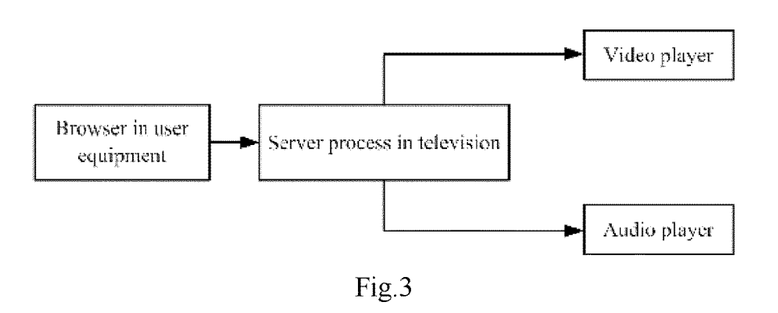
FIG. 3 is a schematic diagram of invoking an audio player and a video player respectively by a television set upon reception of a file uploaded by a UE according to an embodiment of the disclosure.

Particularly the received file is decoded according to the type of the file, and a corresponding player in the television set is invoked for playing, for example, an audio player in the television set is invoked for playing an audio file. As illustrated in FIG. 3, there is a schematic diagram of invoking an audio player and a video player respectively by the television set upon reception of the file uploaded by the UE.

In a practical application, the method for uploading a file to a television set according to the embodiment of the disclosure can be implemented by adding a small server process, e.g., a small apache server process, to a system of the television set, where a file upload page is added to the server process, and when the UE requests to obtain the file upload page, the server process can respond to the UE with the file upload page.

Further to the embodiment above, the received at least one file is decoded and played particularly as follows:

When multiple files are received, the received multiple files are decoded and played randomly; or the received multiple files are ranked in a sequential order of the time when they are uploaded, and then the ranked files are decoded and played. Alternatively the received files can be ranked according to formats of the received files and in a sequential order of the time when they are uploaded, and the disclosure will not be limited in this respect.

Alternatively the user himself or herself can select a file or files to be played from a list of files uploaded by the UE.

Further to the embodiment above, when the file uploaded by the UE is an audio file or a video file, the received file is decoded and played particularly as follows:

The received file is decoded and played in real time.

Particularly the UE uploads the audio file or the video file, and concurrently the television set decodes and plays in real time the file uploaded by the UE, to thereby implement the function of uploading and playing at the same time; and meanwhile the television set can delete a video immediately after the entire video has been played to thereby avoid the video from occupying a too large memory space of the television set.

Figure 4:
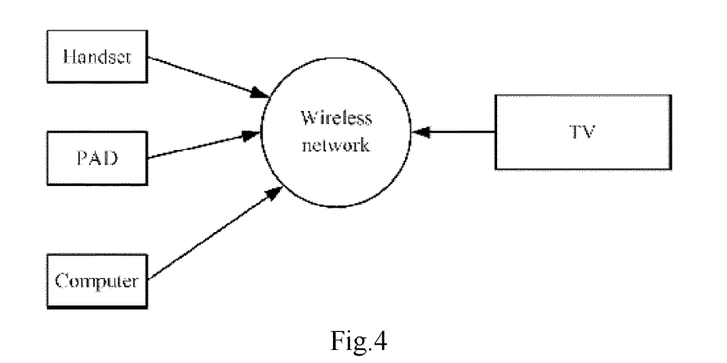
FIG. 4 is a schematic diagram of a connection relationship between a UE (a handset, a PDA, a computer, etc.) and a television set according to an embodiment of the disclosure.
Figure 5:
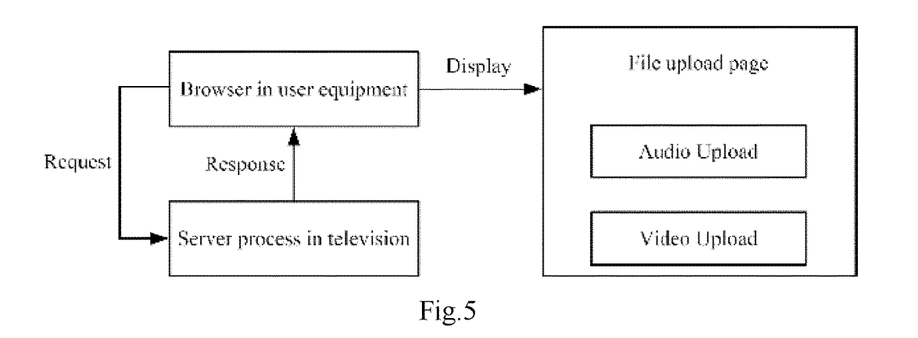
FIG. 5 is a schematic diagram of invoking a file upload page by a UE after sending a request to a television set according to an embodiment of the disclosure.
Figure 6:
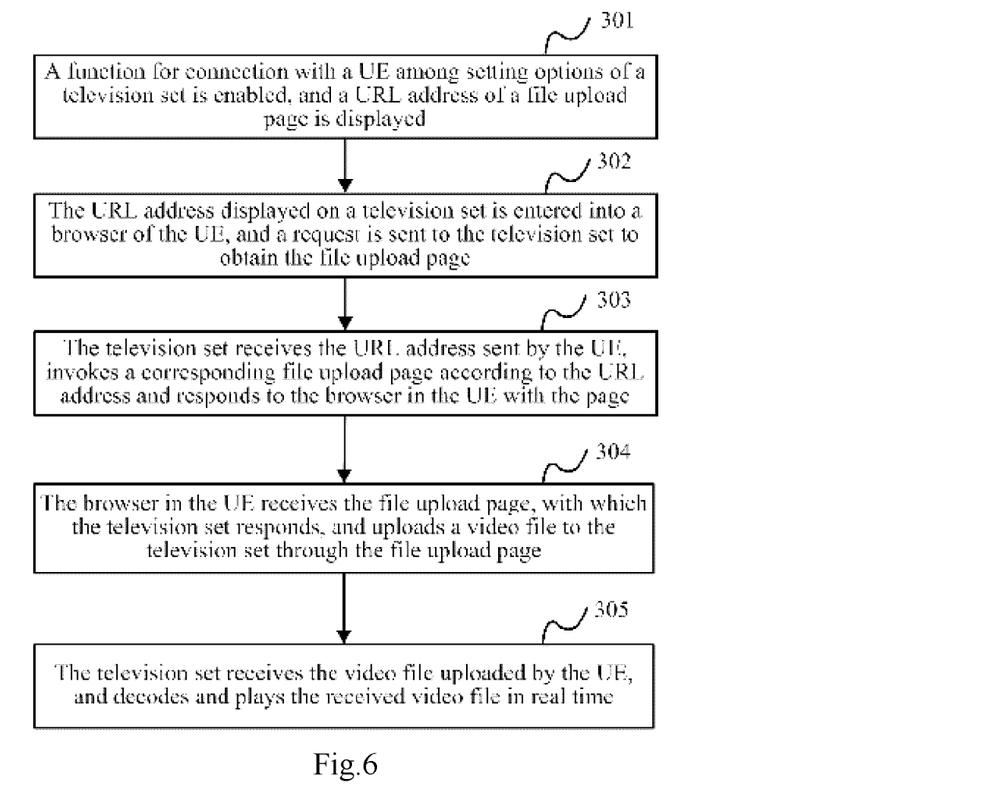
FIG. 6 is a flow chart of uploading to a television set and playing a file by a UE according to an embodiment of the disclosure.

As illustrated in FIG. 4, there is a schematic diagram of a connection relationship between a UE (a handset, a PDA, a computer, etc.) and a television set according to an embodiment of the disclosure. As illustrated in FIG. 5, there is a schematic diagram of invoking a file upload page by the UE after sending a request to the television set; and a flow of uploading to a television set and playing a file by a UE will be described by way of an example, and as illustrated in FIG. 6, the flow includes:

In the block 301, a function for connection with a UE among setting options of a television set is enabled, and then a URL address of a file upload page is displayed.

In the block 302, the URL address displayed on a television set is entered into a browser of the UE, and a request is sent to the television set to obtain the file upload page.

In the block 303, the television set receives the URL address sent by the UE, invokes a corresponding file upload page according to the URL address and responds to the browser in the UE with the page.

In the block 304, the browser in the UE receives the file upload page with which the television set responds and uploads a video file to the television set through the file upload page.

In the block 305, the television set receives the video file uploaded by the UE, and decodes and plays the received video file in real time.

Figure 7:
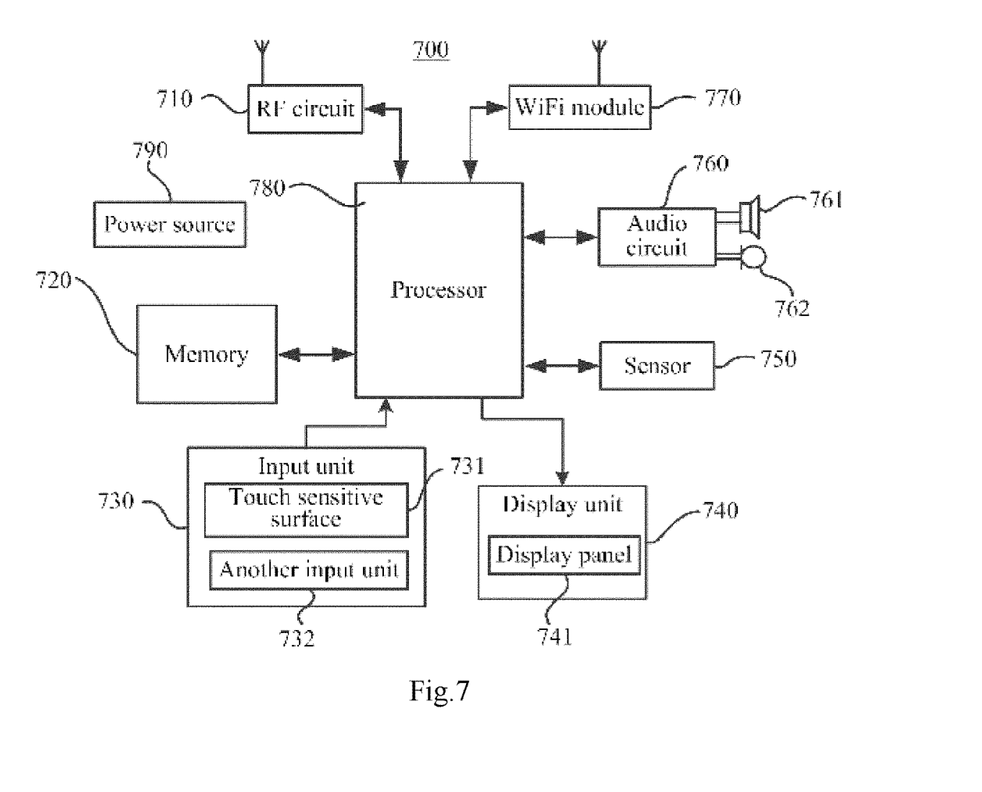
FIG. 7 is a schematic diagram of a user equipment according to an embodiment of the disclosure.

Based upon the same inventive idea as the method for uploading a file to a television set according to an embodiment of the disclosure, an embodiment of the disclosure further provides a User Equipment (UE), and as illustrated in FIG. 7, the User Equipment (UE) includes:

The User Equipment (UE) 700 can include a Radio Frequency (RF) circuit 710, a memory 720 including one or more computer readable storage mediums, an input unit 730, a display unit 740, a sensor 750, an audio circuit 760, a WiFi (Wireless Fidelity) module 780, a processor 780 including one or more processing cores, a power source 790 and other components. Those skilled in the art can appreciate that the user equipment will not be limited to the structure of the user equipment illustrated in FIG. 7 but can include more or less components than those as illustrated or combine some of the components or arrange different components, where:

The RF circuit 710 can be configured to receive and transmit a signal in the course of transmitting and receiving information or communication and particularly configured to transfer downlink information of a base station to the one or more processors 780 for processing upon reception thereof; and further configured to transmit uplink data to the base station. Typically the RF circuit 710 includes but will not be limited to an antenna, at least one amplifier, a tuner, one or more oscillators, a Subscriber Identity Module (SIM) card, a transceiver, a coupler, a Low Noise Amplifier (LAN), a duplexer, etc. Moreover the RF circuit 710 can further communication with a network and other devices through radio communication in compliance with any communication standard or protocol including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory 720 can be configured to store software programs and modules, and the processor 780 is configured to run the software programs and modules stored in the memory 720 to thereby perform various function applications and data processing. The memory 720 can generally include a program storage area and a data storage area, where an operating system, applications required for at least one function (e.g., an audio playing function, an image playing function, etc.), etc., can be stored in the program storage area; and data created for use of the user equipment 700 (e.g., audio data, an address book, etc.), etc., can be stored in the data storage area. Moreover the memory 720 can include a high-speed random access memory and can further include a nonvolatile memory, e.g., at least one magnetic disk memory device, a flash memory device or another volatile solid-state memory device. Correspondingly the memory 720 can further include a memory controller configured to provide an access of the processor 780 and the input unit 730 to the memory 720.

The input unit 730 can be configured to receive input digital or character information and to generate a keyboard, mouse, joystick, optical or track ball signal input related to user setting and function control. Particularly the input unit 730 can include a touch sensitive surface 731 and another input device 732. The touch surface 731, also referred to as a touch display screen or a touch control panel, can collect a touch operation by a user thereon or in proximity thereto (e.g., an operation by the user using a finger, a touch pen or any other appropriate object or attachment on or in proximity to the touch sensitive surface 731) and drive a corresponding connected device by a preset program. Optionally the touch sensitive surface 731 can include two components of a touch detection device and a touch controller, where the touch detection device detects the position of touching of the user and detects a signal as a result of the touch operation and transfers the signal to the touch controller; and the touch controller receives, from the touch detection device, information of the touching and converts it into coordinates of a touch point and further transfers them to the processor 780, and the touch controller can receive and execute a command sent by the processor 780. Moreover the touch sensitive surface 731 can be implemented by various types of resistive, capacitive, infrared, surface sound wave and other types. The input unit 730 can further include another input device 732 in addition to the touch sensitive surface 731. Particularly the another input device 732 can include but will not be limited to one or more of a physical keyboard, functional keys (e.g., volume control press keys, a power press key, etc.), a track ball, a mouse, a joystick, etc.

The display unit 740 can be configured to display information entered by the user or information provided to the user and various graphic user interfaces of the user equipment 700, where these graphic user interfaces can be composed of graphics, texts, icons, videos or any combination thereof. The display unit 740 can include a display panel 741, and optionally the display panel 741 can be configured in the form of a Liquid Crystal Display (LCD), an Organic Light-Emitting Diode (OLED) display, etc. Furthermore the touch sensitive surface 731 can overlie the display panel 741, and the touch sensitive surface 731, upon reception of the touch operation thereon or in proximity thereto, transfers information of touch operation to the processor 780 to determine the type of the touch event, and thereafter the processor 780 provides a corresponding visual output on the display panel 741 according to the type of the touch event. Although the touch sensitive surface 731 and the display panel 741 are illustrated in FIG. 7 as two separate components to perform the input and output functions, the touch sensitive surface 731 and the display panel 741 can be integrated to perform the input and output functions in some embodiments.

The user equipment 700 can further include at least one sensor 750, e.g., an optical sensor, a motion sensor and other sensors. Particularly the optical sensor can include an ambient optical sensor and a proximity sensor, where the ambient optical sensor can adjust the brightness of the display panel 741 according to the illumination of ambient light rays, and the proximity sensor can disable the display panel 741 and/or a backlight when the user equipment 700 moves in proximity to an ear. A gravity acceleration sensor which is a motion sensor can detect the magnitudes of accelerations in respective directions (typically three axes) and can detect the magnitude and the direction of gravity when the sensor is stationary and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the user equipment 700 can be further configured with a gyroscope, a barometer, a hygrometer, a thermometer, an infrared sensor and other sensors, and a repeated description of these components will be omitted here.

The audio circuit 760, a speaker 761 and a microphone 762 can provide an audio interface between the user and the user equipment 700. The audio circuit 760 can receive and convert audio data into an electric signal and transmit the electric signal to the speaker 761, and the speaker 761 can convert the electric signal into an audio signal for output; and on the other hand, the microphone 762 converts a collected audio signal into an electric signal which is received by the audio circuit 760 and then converted into audio data, and the audio data is further output to the processor 780 for processing and then transmitted by the RF circuit 710 to another user equipment, for example, or the audio data is output to the memory 720 for further processing. The audio circuit 760 may further include an earphone jack for communication between an external earphone and the user equipment 700.

The WiFi is a technology of short-range wireless transmission, and the user equipment 700 can assist the user in transmitting and receiving an email, browsing a web page, accessing streaming media, etc., and also provide the user with a wireless broadband access to the Internet, through the WiFi module 770. Although FIG. 7 illustrates the WiFi module 770, it can be appreciated that the WiFi module 770 is not necessarily required for the user equipment 700 but can be omitted as desired without departing from the scope of the disclosure.

The processor 780 is a control center of the user equipment 700, has the respective components of the entire user equipment connected by various interfaces and lines, and runs or executes the software programs and/or modules stored in the memory 720 and invokes the data stored in the memory 720 to perform the various functions of the user equipment 700 and process the data to thereby manage and control the user equipment as a whole. Optionally the processor 780 can include one or more processing cores; and optionally the processor 780 can be integrated with an application processor and a modem processor, where the application processor generally handles the operating system, the user interfaces, the applications, etc., and the modem processor generally handles wireless communication. As can be appreciated, the modem processor may not be integrated into the processor 780.

The user equipment 700 further includes a power source 700 (e.g., a battery) powering the respective components, and optionally the power source can be logically connected with the processor 780 by a power management system to thereby perform charging and discharging management, power consumption management, etc., by the power management system. The power source 790 can further include one or more DC or AC power sources, recharging systems, power source failure detection circuits, power source transformers or inverters, power source status indicators and any other appropriate components.

Although not illustrated, the user equipment 700 can further include a camera, a Bluetooth module, etc., and a repeated description thereof will be omitted here. Particularly in this embodiment, the display unit of the user equipment is a touch screen display, and the user equipment further includes a memory in which one or more programs are stored, wherein the one or more programs are configured to be executed by one or more processors. The one or more programs include instructions for performing the method as illustrated in FIG. 1, and for details of the method, reference can be made to FIG. 1 and the relevant description thereof.

Figure 8:
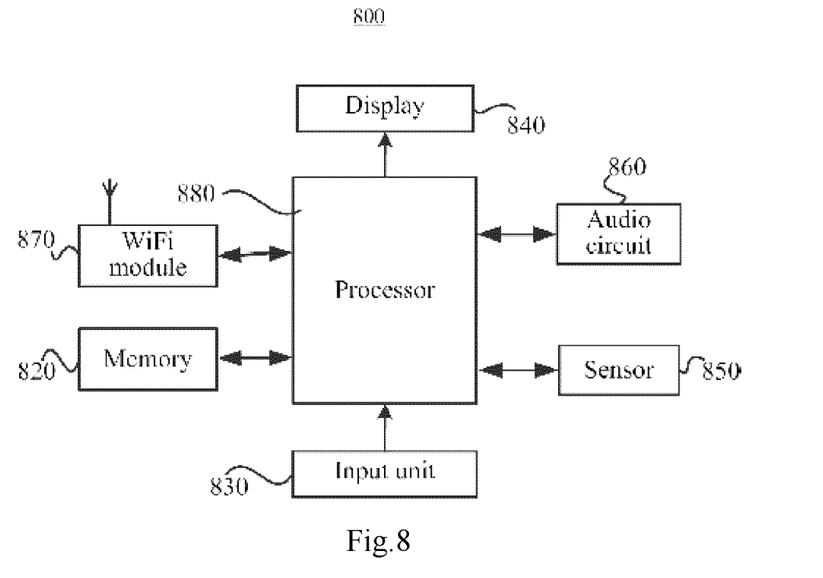
FIG. 8 is a schematic diagram of a television set according to an embodiment of the disclosure.

An embodiment of the disclosure further provides a television set, and as illustrated in FIG. 8, the television set includes:

The television set 800 can include a memory 820 including one or more computer readable storage mediums, an input unit 830, a display unit 840, a sensor 850, an audio circuit 860, a WiFi (Wireless Fidelity) module 880, a processor 880 including one or more processing cores and other components. Those skilled in the art can appreciate that the television set will not be limited to the structure of the television set illustrated in FIG. 8 but can include more or less components than those as illustrated, or combine some of the components or arrange different components, where:

The memory 820 can be configured to store software programs and modules, and the processor 880 is configured to run the software programs and modules stored in the memory 820 to thereby perform various function applications and data processing. The memory 820 can generally include a program storage area and a data storage area, where an operating system, applications required for at least one function (e.g., an audio playing function, an image playing function, etc.), etc., can be stored in the program storage area; and data created for use of the television set 800 (e.g., audio data, an address book, etc.), etc., can be stored in the data storage area. Moreover the memory 820 can include a high-speed random access memory and can further include a nonvolatile memory, e.g., at least one magnetic disk memory device, a flash memory device or another volatile solid-state memory device. Correspondingly the memory 820 can further include a memory controller configured to provide an access of the processor 880 and the input unit 830 to the memory 820.

The input unit 830 can be configured to receive an input control instruction, e.g., an instruction issued by a user to the television set through a remote control or another device.

The display unit 840 can be configured to display various graphic user interfaces of the television set and output decoded video information, where these graphic user interfaces can be composed of graphics, texts, icons, videos or any combination thereof. The display unit 840 can include a display panel, and optionally a display panel can be configured in the form of a Liquid Crystal Display (LCD), an Organic Light-Emitting Diode (OLED) display, etc.

The television set 800 can further include at least one sensor 850, e.g., an optical sensor and other sensors. Particularly the optical sensor can include an ambient optical sensor and an infrared sensor, where the ambient optical sensor can adjust the brightness of the display panel according to the illumination of ambient light rays, and the infrared sensor can receive an instruction of a remote control.

The audio circuit 860 can provide an audio output of the television set 800, and particularly the audio circuit 860 can receive and convert audio data into an electric signal and output the electric signal through a speaker (not illustrated).

The WiFi is a technology of short-range wireless transmission, and the television set 800 can assist the user in an access to a local area network or a wide area network for interconnection and intercommunication with another device as well as transmitting and receiving an email, browsing a web page, accessing streaming media, etc., through the WiFi module 870. Although FIG. 8 illustrates the WiFi module 880, it can be appreciated that the WiFi module 880 is not necessarily required for the television set 800 but can be omitted as desired without departing from the scope of the disclosure.

The processor 880 is a control center of the television set 800, has the respective components of the entire television set connected by various interfaces and lines, and runs or executes the software programs and/or modules stored in the memory 820 and invokes the data stored in the memory 820 to perform the various functions of the television set 800 and process the data to thereby manage and control the television set as a whole. Optionally the processor 880 can include one or more processing cores; and optionally the processor 880 can be integrated with a control processor and a decoding processor, where the control processor generally handles the operating system, the user interfaces, the applications, etc., and the decoding processor generally handles an operation of decoding audio and video data. As can be appreciated, the decoding processor may not be integrated into the processor 880.

Particularly in this embodiment, the memory 820 has one or more programs stored therein, which are configured to be executed by one or more processors. The one or more programs include instructions for performing the method as illustrated in FIG. 2, and for details of the method, reference can be made to FIG. 2 and the relevant description thereof.

An embodiment of the disclosure further provides a computer readable storage medium which can be a computer readable storage medium included in the memory according to the embodiment described above or which can be embodied separately as a computer readable storage medium which is not installed in the User Equipment (UE) or the television set. The computer readable storage medium includes one or more programs stored therein which are executed by one or more processors to perform the method or methods as illustrated in FIG. 1 and/or FIG. 2, and for details of the method, reference can be made to FIG. 1 and/or FIG. 2 and the relevant descriptions thereof.

With the methods and apparatuses for uploading a file to a television set and playing a file according to the disclosure, there are the following advantageous effects: the television set is accessed by the browser in the UE, so that it is not necessary to install a specific application on the UE side dependent upon a different platform to support the function of accessing the television set, thus alleviating a burden on the UE side and lowering a development cost; and the file upload page is added to the television set system, so that the television set is accessible to the UE side through the browser without installing any specific application in the UE. With the highly versatile browser in the UE and the corresponding file upload page on the television set, the UE can upload a file to the television set for playing, and a demand of the user for audio and video files, WORD and PPT documents, etc., can be accommodated with better versatility.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for uploading a file to a television set, the method comprising:
   sending, by a browser in a User Equipment, a request directly to the television set for a file upload page hosted by a server on the television set, wherein the request carries a Uniform Resource Locator address of the file upload page, by obtaining a two-dimension code address of the file upload page on the television set through scanning, converting the two-dimension code address into a corresponding Uniform Resource Locator address, and sending by the browser in the User Equipment the request to the television set for the file upload page;
   receiving, by the browser in the User Equipment, the file upload page from the server on the television set, and
   uploading, from the User Equipment, at least one file through the file upload page directly to the server on the television set.

2. The method according to claim 1, wherein the file includes at least an audio file, a video file or a WORD document, and the size of the file is in a preset range.

3. The method according to claim 1, wherein the User Equipment and the television set are located in a same local area network.

4. A method for playing a file by a television set, the method comprising:
   displaying a two-dimension code address of a file upload page hosted by a server on the television set;
   receiving, by the server on the television set, a request for the file upload page hosted by the server, sent directly from a browser in a User Equipment, wherein the request carries a Uniform Resource Locator address of the file upload page;
   responding, by the server on the television set, to the request from the browser in the User Equipment with the file upload page in response to the request;
   receiving, by the server on the television set, at least one file uploaded from the User Equipment through the file upload page to the server; and
   decoding and playing, by the television set, the received at least one file.

5. The method according to claim 4, wherein the receiving the request for a file upload page sent directly from the browser in the User Equipment and responding to the request from the browser in the User Equipment with the file upload page in response to the request further comprises:
   receiving the Uniform Resource Locator address of the file upload page, sent directly from the browser in the User Equipment, invoking a corresponding file upload page according to the Uniform Resource Locator address, and responding to the browser in the User Equipment with the file upload page.

6. The method according to claim 4, wherein the file includes at least an audio file, a video file or a WORD document.

7. The method according to claim 6, wherein when the file includes the audio file or the video file, the decoding and playing the received at least one file further comprises:
decoding and playing the received file in real time.

8. The method according to claim 4, wherein the decoding and playing the received at least one file further comprises:
when multiple files are received, decoding and playing randomly the multiple files; or
ranking the received multiple files in a sequential order of time when they are uploaded, and then decoding and playing the ranked files.

9. The method according to claim 4, wherein the User Equipment and the television set are located in a same local area network.

10. A User Equipment comprising:
a memory; and
one or more processors, wherein:
the memory has one or more computer readable program codes stored therein, and the one or more processors are configured to execute the one or more computer readable program codes to perform:
sending, by a browser in a User Equipment, a request directly to a television set for a file upload page hosted by a server on the television set, wherein the request carries a Uniform Resource Locator address of the file upload page, by obtaining a two-dimension code address of the file upload page on the television set through scanning, converting the two-dimension code address into a corresponding Uniform Resource Locator address, and sending by the browser in the User Equipment the request to the television set for the file upload page;
receiving, by the browser in the User Equipment, the file upload page from the server on the television set, and
uploading at least one file through the file upload page directly to the server on the television set.

11. The User Equipment according to claim 10, wherein the file includes at least an audio file, a video file or a WORD document, and the size of the file is in a preset range.

12. The User Equipment according to claim 10, wherein the User Equipment and the television set are located in a same local area network.

13. A television set, comprising:
a memory; and
one or more processors, wherein:
the memory has one or more computer readable program codes stored therein, and the one or more processors are configured to execute the one or more computer readable program codes, including computer readable program codes for operating a server, to perform:
displaying a two-dimension code address of a file upload page hosted by the server:
receiving, by the server, a request for the file upload page hosted by the server, sent directly from a browser in a User Equipment, wherein the request carries a Uniform Resource Locator address of the file upload page;
responding, by the server, to the request from the browser in the User Equipment with the file upload page in response to the request;
receiving, by the server, at least one file uploaded from the User Equipment through the file upload page; and
decoding and playing, by the television set, the received at least one file.

14. The television set according to claim 13, wherein the receiving the request for a file upload page sent directly from the browser in the User Equipment and responding to the request from the browser in the User Equipment with the file upload page in response to the request further comprises:
receiving the Uniform Resource Locator address of the file upload page, sent directly from the browser in the User Equipment, invoking a corresponding file upload page according to the Uniform Resource Locator address, and responding to the browser in the User Equipment with the file upload page.

15. The television set according to claim 13, wherein the file includes at least an audio file, a video file or a WORD document.

16. The television set according to claim 13, wherein the decoding and playing the received at least one file further comprises:
when multiple files are received, decoding and playing randomly the multiple files; or
ranking the received multiple files in a sequential order of time when they are uploaded, and then decoding and playing the ranked files.

17. The television set according to claim 15, wherein when the file includes the audio file or the video file, the decoding and playing the received at least one file further comprises:
decoding and playing the received file in real time.

18. The television set according to claim 13, wherein the User Equipment and the television set are located in a same local area network.

* * * * *